Sept. 5, 1967     W. A. MOSOW     3,339,389
METHOD OF FORMING SELF-LOCKING THREADED FASTENING MEMBER
Filed Feb. 16, 1965
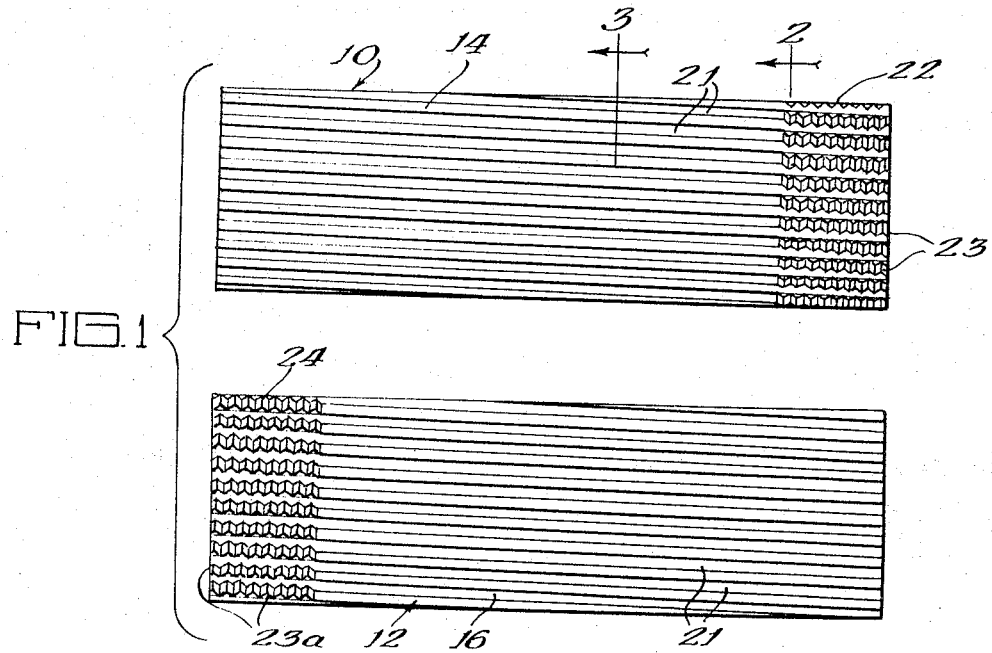
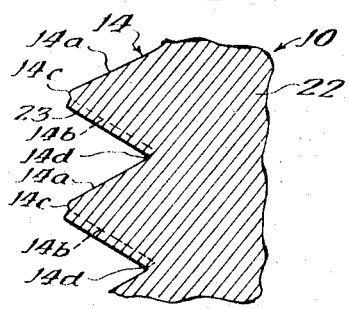
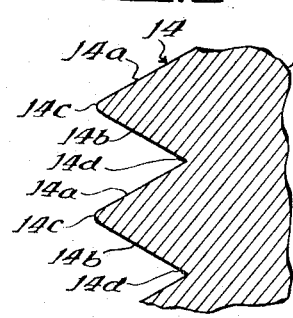
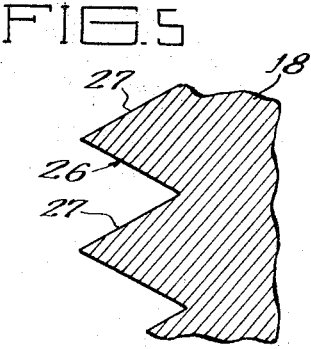
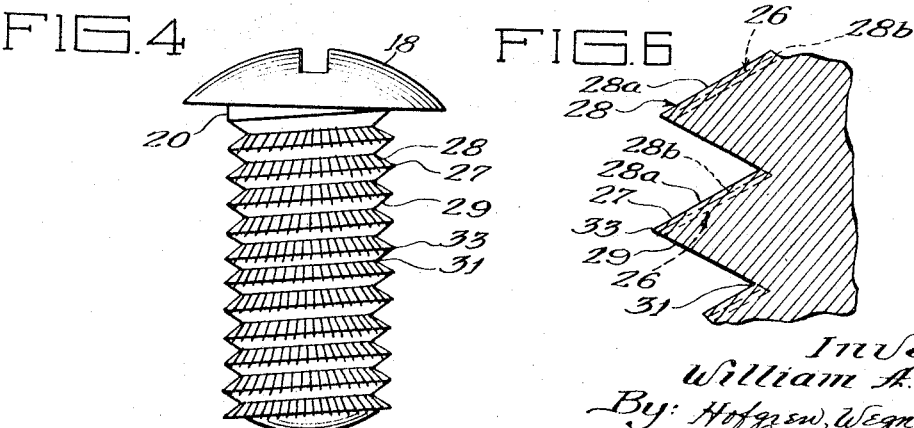
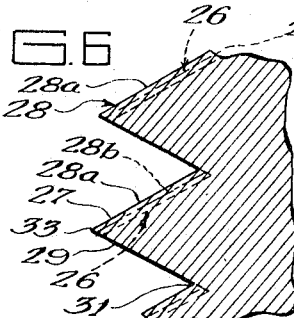
Inventor:
William A. Mosow
By: Hofgren, Wegner, Allen,
Stellman & McCord
Attorneys United States Patent Office 3,339,389
Patented Sept. 5, 1967

3,339,389
METHOD OF FORMING SELF-LOCKING THREADED FASTENING MEMBER
William A. Mosow, Greenville, Miss., assignor to National Lock Co.
Filed Feb. 16, 1965, Ser. No. 433,107
9 Claims. (Cl. 72—88)

This invention relates to a method and apparatus for forming a self-locking threaded fastening member. This invention is a continuation-in-part of my copending application entitled, "Method of Forming Self-Locking Threaded Fastening Member," Ser. No. 177,528, filed Mar. 5, 1962, now abandoned.

Current threaded fastening devices require the use of separate locking devices or specially designed lock nuts in order to insure that the fastening device will be a permanent attachment. The use of an additional locking member, especially in high-speed production lines, is a costly and time-consuming procedure.

It is a primary object of this invention to provide a method of forming self-locking threaded fastening elements which do not require the use of separate locking devices.

It is another object of this invention to provide a method of forming self-locking threaded fastening elements wherein the threaded element is adapted for threaded engagement with a standard threaded member, such as a standard nut or tapped hole.

It is another object of this invention to provide an apparatus for forming a self-locking threaded fastening element having a plurality of radial deformations in the pressure-bearing face of the screw thread to provide a fastening element adapted for threaded engagement with a standard threaded member, such as a nut or threaded receptacle.

It is yet another object of this invention to provide a method of forming self-locking threaded fastening elements by rolling the fastening element between dies to form a screw thread on the element undersize relative to a standard threaded member with which the element is intended to be used, continuing the rolling of the threaded element between the dies to form a plurality of radial deformations in one face of the screw thread, the deformations being alternately spaced recesses and projections substantially normal to the first formed face of the thread resulting in a thread profile adapted for threaded engagement with a standard threaded member, such as a nut or tapped hole.

Further features and advantages will be readily apparent from the following specification and from the drawings, in which:

FIGURE 1 is a view of a pair of thread-rolling dies for use in forming screw threaded fastening elements in accordance with my invention;

FIGURE 2 is an enlarged fragmentary sectional view taken along line 2—2 of FIGURE 1;

FIGURE 3 is an enlarged sectional view taken along the line 3—3 of FIGURE 1;

FIGURE 4 is an elevational view of a threaded fastening element made in accordance with this invention;

FIGURE 5 is a fragmentary sectional view of the thread profile formed by the die shown in FIGURE 3; and FIGURE 6 is a fragmentary sectional view of the thread profile of the fastening element shown in FIGURE 4.

To achieve the aforementioned objects, a pair of dies 10 and 12 are used. Preferably these dies are rectangular blocks having corrugated thread-forming surfaces or ribs 14 and 16 on one face of each of the dies 10 and 12, respectively. The ribs have two inclined faces, such as 14 and 14b which intersect in a crest 14c and root 14a for embossing a conventional V-shaped helical screw thread on a fastening element 18, in the shank 20 thereof. These dies are adapted to emboss a fastening element which is made of a metal, such as steel, brass, or the like. The fastening element 18 has its shank 20 placed between the dies and is rolled therebetween by movement of one or both of the die blocks. This relative movement of the die blocks causes rotation of the fastening element between the corrugated surfaces of the die blocks and the thread surface is impressed thereupon. Any desired thread may be formed on the fastening element in the first stage of this process.

The end or discharge portion 22 and 24 of each die 10 and 12, respectively, has a special embossing surface. That face 14b of the ribs which normally forms the pressure-bearing face of the fastening element is provided with a series of upstanding teeth 23. The portion 24 of die 16 has a similar toothed surface 23a. These teeth may be of any suitable configuration to produce the deformation desired to be imparted to the pressure-bearing face of the screw thread. Preferably, the deformations are formed generally perpendicular to the screw-thread face and radial to the shaft. In the first step of the process, the screw shank has a standard V-shaped uninterrupted thread 26 formed by the ribs 14 and 16 of the dies 10 and 12, respectively, as shown in FIGURE 5. As the fastening element continues through the dies 10 and 12, it is subjected to the upstanding teeth 23 and 23a on that face 14b of the ribs which forms the pressure-bearing face 27 of the fastener thread. The teeth 23 and 23a form radial deformations 28, such as projections or raised deformations 28a and recessed deformations 28b in the pressure-bearing face 27 of the thread, as shown in FIGURES 4 and 6. It is to be noted that the profile of the thread in the area of the recesses 28b is smaller than the thread configuration 26 produced by the thread-forming portion of the dies 10 and 12 as shown in dotted outline in FIGURE 6. Conversely, the projections 28a define a profile larger than the thread profile produced by the ribs 14 and 16 and is the mating profile for the thread of a female member with which the fastening element produced by the dies 10 and 12 is intended to be used.

The resultant screw thread profile is substantially V-shaped in a plane passed through any diameter of the shank, having an inclined pressure-bearing face 27, and an inclined non-pressure bearing face 29. Each face 27 and 29 intersects the other at the thread root 31 and thread crest 33. The thread profile is uninterrupted in that in any such aforesaid plane, the surface between the root and the crest is defined by a straight line.

After the thread has been formed with the pressure-bearing face of the thread provided with radial deformations 28, a longitudinal section of the fastening member at any given point still describes a screw thread of conventional or standard profile and thus the resultant thread produced is still capable of use with a female member having a conventional or unaltered thread. In other words, the "standard profile" of the thread embossed by the method of this application means that the profile of the screw thread defined by a plane passing through any diameter of the shank describes a V-shaped, uninterrupted screw thread. More specifically, the crests of projections 28a define a plane corresponding with the standard thread tapped in the female member with which the screw is used. It need not conform with any particular thread recognized or established by an engineering group. The point is that the screw is formed undersize and would have a sloppy fit if used before the deformations are embossed on the thread. The embossing operation forces the crest of the projections to the proper level to match the female thread.

Cylindrical or other forms of dies may be used as well as the rectangular block die illustrated. As previously mentioned, one die may be fixedly mounted and the other may reciprocate relative to it, or both may be mounted for reciprocation. It is possible that this method may be embodied in a two-step process with a thread being formed separately from the dies forming the radial deformation. It is preferable, however, that the thread be formed in one operation, to eliminate the problem of alignment of the thread and blank with the die.

Metal has an inherent "grain" formed in it and contains certain impurities within the grain. Embossing surfaces on a metal member is in many cases preferable to cutting the appropriate surface therein for embossing tends to "stretch" or "bend" the grain and impurities in the metal while cutting the metal breaks the grain and impurities and tends to weaken the metal element. Thus it is advantageous that the radial deformations be embossed in the fastening element and even more advantageous that the first formed undersize thread be embossed also. The embossing should preferably be done in one step in the same die. If a thread is separately formed, either by cutting or embossing, and the fastening element is placed in a die to have the radial deformations embossed therein, there is a possibility that the preformed thread of the fastening element will not mate with the appropriate ribs of the die and the thread will be disfigured. This is not possible when the thread and radial deformations are embossed in the same die in one step. The one die, one step embossing, insures that a uniform accurate self-locking fastening element will be produced every time.

The fastening element is adapted to be used with a female member designed for use with a threaded element having a profile defined by that portion of the thread described by the projections 28a on the pressure-bearing face 27. As the fastening element is tightened within the female member, the projections on the pressure-bearing surface break into the adjacent surface of the female member, locking the fastening element therein. The thread of the screw should be harder than that of the female member, and may be subjected to a hardening treatment following formation of the thread.

By means of this invention, a fastening element may be produced with a self-locking surface as a part of the process of forming the thread on the element. Conventional dies are used with modifications only on the thread-forming surface. Thus, these dies may be used in existing thread rolling machinery. Furthermore, since this may be a one-step process, no alterations in production procedures or increases in cost is effectuated thereby. Finally, this invention produces a self-locking element which is adapted for use with conventional female fastening members.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. The method of forming a self-locking threaded fastening element including the steps of forming a screw thread on the element and subsequently forming a plurality of spaced radial recessed and projecting deformations in one face of said thread while maintaining a radially uninterrupted thread profile adapted for threaded engagement with a standard threaded member.

2. The method of forming self-locking threaded fastening elements including the steps of forming a screw thread on the element undersize relative to a standard threaded member with which said element is intended to be used and subsequently forming a plurality of radial deformations in one face of the screw thread, said deformations being alternate spaced recesses and projections substantially normal to said face of said thread resulting in a radially uninterrupted thread profile adapted for threaded engagement with a standard threaded member.

3. The method of forming self-locking threaded fastening elements including the steps of rolling the fastening element between dies to form a conventional helical screw thread on the element and subsequently embossing a plurality of radial recessed and raised deformations in the pressure bearing face of the screw thread while maintaining a helical thread profile for threaded engagement with a sandard female threaded member.

4. The method of forming self-locking threaded fastening elements including the steps of rolling the fastening element between dies to emboss a screw thread on the element undersize relative to a standard threaded member with which said element is intended to be used and subsequently embossing a plurality of radial recessed and raised deformations in the pressure bearing face of the screw thread to produce a fastener having an uninterrupted thread profile with said deformations in the pressure bearing face thereof and adapted for threaded engagement with a standard female threaded member.

5. The method of forming self-locking threaded fastening elements including the steps of rolling the fastening element between dies to form a conventional helical screw thread on the element and subsequently continuously rolling the threaded element between said dies to form a plurality of radial recessed and raised deformations in the pressure-bearing face of the screw thread to produce a fastener having an uninterrupted thread profile with said deformations in the pressure bearing face thereof and adapted for threaded engagement with a standard female threaded member.

6. The method of forming self-locking threaded fastening elements including the steps of rolling the fastening element between dies to emboss a conventional helical screw thread on the element undersize relative to a standard threaded member with which said element is intended to be used and subsequently continuously rolling the threaded element between said dies having teeth in one thread face forming surface of the die to form a plurality of radial raised and recessed deformations in the pressure-bearing face of the screw thread to produce a fastener having an uninterrupted helical thread profile with deformations in the pressure-bearing face thereof, said fastener thereby being adapted for threaded locking engagement with a standard female threaded members.

7. The method of forming a self-locking threaded fastening element comprising the steps of rolling the fastening element between dies having a first portion with conventional thread forming surfaces thereon including a plurality of ribs having two inclined faces and a crest and a root to emboss a conventional helical screw thread on said element; and subsequently continuously rolling the threaded element between second portions of said dies, said second portions having teeth on one of said inclined faces to form a plurality of radial raised and recessed deformations in the pressure-bearing face of the screw thread to produce a fastener having an uninterrupted helical thread profile with deformations in the pressure-bearing face thereof, said fastener thereby adapted for threaded locking engagement with a standard female threaded member.

8. The method of forming a self-locking threaded fastening element comprising the steps of: rolling the fastening element between dies having a first portion with thread forming surfaces thereon including a plurality of ribs having two inclined faces and a crest and a root to emboss a V-shaped helical screw thread on said element undersize relative to a standard threaded member with which said element is intended to be used; and subsequently continuously rolling the threaded element between second portions of said dies having teeth on one of said inclined faces to form a plurality of radial raised and recessed deformations in the pressure-bearing face of the screw thread to produce a fastener having a V-shaped, uninterrupted, smooth screw thread profile in a plane passed through any diameter of the screw shank with deformations in the pressure-bearing face thereof, said fastener thereby adapted for threaded locking engagement with a standard threaded female member.

9. In combination with a screw thread rolling apparatus, die blocks for forming a self-locking threaded fastener, said blocks having first portions with thread forming surfaces thereon including ribs having inclined faces intersecting in a crest and a root, and second portions on said die blocks, said second portions having teeth on one of said inclined faces for forming radial deformations in the face of a screw thread during screw rolling operation of two of such dies.

References Cited
UNITED STATES PATENTS 2,867,786  1/1959  Doetsch _____ 151—22
3,044,329  7/1962  Setbert _____ 72—90

FOREIGN PATENTS 969,106  4/1958  Germany.

CHARLES W. LANHAM, Primary Examiner

H. D. HOINKES, Assistant Examiner.